United States Patent [19]
Oliver

[11] 3,787,063
[45] Jan. 22, 1974

[54] SHOPPING CART OR THE LIKE

[76] Inventor: Earl J. Oliver, 555 Montague Ave., Fremont, Calif. 94577

[22] Filed: Dec. 10, 1970

[21] Appl. No.: 96,704

[52] U.S. Cl... 280/33.99 F, 186/1 AC, 280/33.99 H
[51] Int. Cl............................................. B62b 11/00
[58] Field of Search 280/33.99 R, 33.99 F, 33.99 H; 186/1 AC

[56] References Cited
UNITED STATES PATENTS

| | | | |
|---|---|---|---|
| 2,958,536 | 11/1960 | Young | 280/33.99 F |
| 2,812,187 | 11/1957 | Nicholl | 280/33.99 F |
| 2,605,116 | 7/1952 | Alexander | 280/33.99 H |
| 3,536,283 | 10/1970 | Lowe | 280/33.99 H X |

FOREIGN PATENTS OR APPLICATIONS

| | | | |
|---|---|---|---|
| 1,064,689 | 4/1967 | Great Britain | 280/33.99 H |
| 801,164 | 9/1958 | Great Britain | 280/33.99 H |
| 457,154 | 7/1968 | Switzerland | 280/33.99 H |

*Primary Examiner*—Gerald M. Forlenza
*Assistant Examiner*—George F. Abraham

[57] ABSTRACT

A shopping cart or the like having a container adapted to receive articles therein, and having also wheels enabling the cart to be propelled along the aisles of a supper market or similar establishment. The cart includes wheel-equipped frame structure having a container supported thereby for selective angular displacements between a generally horizontal position of use and a generally vertical position in which a plurality of carts can be disposed in successive juxtaposition with frame and container portions of one cart nested within frame and container portions of an adjacent cart. The container has a movable bottom wall displaceable between retracted and extended positions in accordance with the magnitude of the weight supported at any time by the bottom wall, thereby making the chamber defined by the container automatically expandable to accommodate the size of the load placed therein by a shopper, and automatically retractable as such load is removed therefrom to facilitate unloading of the chamber at the check out counter of such market. The movable bottom wall is floatingly supported so that it will not bind if subjected to asymmetrical loading.

17 Claims, 13 Drawing Figures

PATENTED JAN 22 1974

INVENTOR:
EARL J. OLIVER
BY: Joseph B. Gardner
ATTORNEY

INVENTOR:
EARL J. OLIVER
BY: Joseph B. Sandre
ATTORNEY

INVENTOR:
EARL J. OLIVER
BY: Joseph B. Gardner
ATTORNEY

SHOPPING CART OR THE LIKE

This invention relates to containers adapted to be transported with a shopper to provide a readily available chamber into which selected articles can be placed, and it relates more particularly to shopping carts or the like adapted to be propelled by a shopper along the aisles of a supper market or similar establishment and into which selected articles are placed for transport with the shopper for ultimate unloading at the check out counter.

Shopping carts of the general type being considered herein are very well known by the general public since they have found extensive use nationally, and to some extent internationally, in large retail establishments of all types including large grocery stores or supper markets, produce markets, drug stores, dry good stores, etc. For the most part, all such carts are similar, having a wheel-equipped frame and a container mounted thereon which provides the chamber into which each article is placed as it is selected by the shopper. A handle provided by the cart enables the shopper to propel the same through the aisles of the retail establishment as he or she moves therethrough.

An object of the present invention is to provide an improved shopping cart of the general type noted, and which improved cart is convenient to use, is able to receive much larger loads than shopping carts now in use, and enables a plurality of carts to be arranged in nested juxtaposition forming a stacked succession of carts when not in use.

Additional objects and advantages, among others, of the present invention is in the provision of an improved cart of type described in which the article-receiving chamber is expandable, increasing in capacity automatically as articles are deposited therein and decreasing in size automatically as articles are removed therefrom; in which such variable-capacity chamber is provided in part by a movable bottom wall which is floatingly supported for displacements between retracted and extended positions and is able to accommodate asymmetrically disposed loads imposed thereon; in which unloading of the chamber may be accomplished through an opening in a side wall of the chamber-defining container equipped with a movable gate normally closing such opening; in which the gate is easy and convenient to use having stop-latch structure associated therewith which stops movement of the gate in closed position and thereafter constrains the gate in such position when released by the check out clerk; in which an infant's seat, for sanitary purposes is disposed entirely on the exterior of the article-receiving chamber of the cart; in which the chamber-defining container of the cart is supported for pivotal displacements between a generally horizontal position of use and a generally vertical position for storage; and in which lock means associated with the pivotal support for the container prevents inadvertent angular displacements thereof into the vertical position, thereby preventing spillage of the chamber contents.

Further objects and advantages of the invention, especially as concerns particular features and characteristics thereof, will become apparent as the specification continues.

An embodiment of the invention is illustrated in the accompanying drawings, in which.

Figure 1:
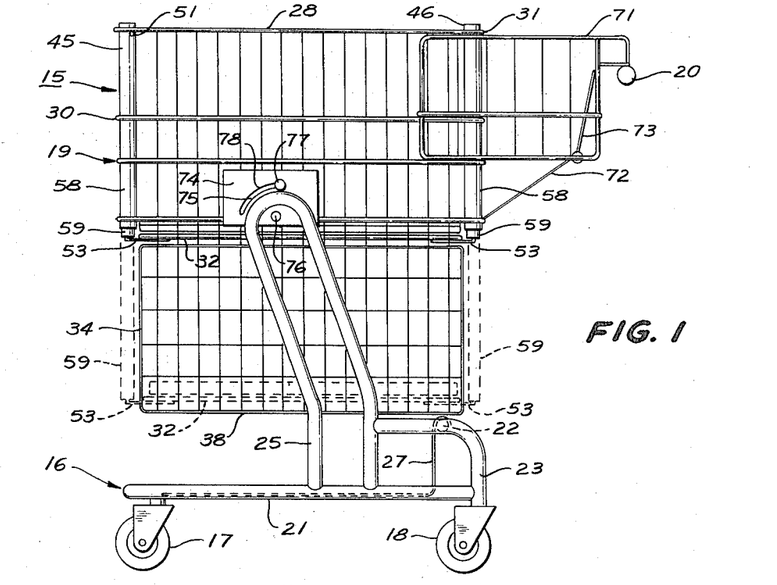
FIG. 1 is a side view in elevation of a shopping cart embodying the present invention with the container of such cart being shown in the horizontal position of use.

The shopping cart illustrated in FIG. 1 is denoted in its entirety with the numeral 15, and it has many of the functional characteristics of conventional shopping carts in the sense that it is a wheel-equipped container adapted to be manually propelled along the aisles of a store or market and have articles deposited therein. The cart 15 departs in both specific structural and functional characteristics from conventional shopping carts, however, and has many features of improvement and advantage not found therein, all as will be made apparent hereinafter. In terms of its general structure, the cart 15 is provided with frame structure 16 having front and rear wheels 17 and 18 mounted thereon, a container 19 carried by the frame structure, and a handle 20 by means of which the cart is manually controlled and propelled during use thereof.

Figure 13:
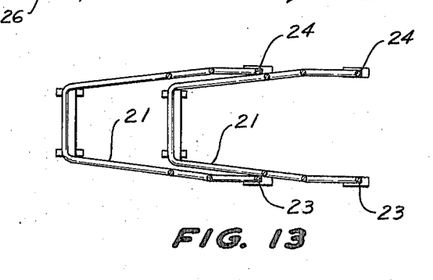
FIG. 13 is a broken sectional view taken generally along the line 13—13 illustrating the disposition of the frame structures of a pair of nesting carts.

The frame structure 16 of the cart includes a lower or base frame element 21 of modified U- or V-shaped configuration, as is most evident in FIG. 13. The frame element 21 is closed or continuous adjacent the forward end of the cart and is open at its rear end to permit insertion thereinto of the frame element 21 of a similar cart, as will be explained further hereinafter. A transversely disposed joist or support element 22 is located adjacent the open rear end of the frame element 21 and is mounted in vertically spaced relation therewith on a pair of L-shaped side elements 23 and 24 which are rigidly related adjacent their lower ends to the frame element 21 and extend upwardly and forwardly therefrom to connect at their forward ends to columns or standards 25 and 26, each of which has an inverted, somewhat U-shaped configuration and at its lower end is rigidly united with the frame element 21.

The support joist 22 is welded or otherwise rigidly secured to the side frames 23 and 24 rearwardly of the standards 25 and 26 and somewhat forwardly of the rear terminus of the frame element 21.

The frame structure 16 may be fabricated in any conventional and convenient manner and, in the form shown, is of hollow tubular construction; and it may be fabricated of any material usually employed for this purpose such as steel which can be chrome plated for esthetic purposes. Further, the various elements comprising the frame structure 16 may be secured one to another by any standard technique as, for example, by welding as in the case of the cart 15 being considered, or by riveting or pinning the various elements one to another, each of which is standard practice in devices of this type. If desired, a rack 27 may be supported in generally parallel relation with the frame element 21 so as to permit articles to be supported thereon. In the form shown, the rack 27 is loosely supported by the frame 16 so as to permit it to be displaced upwardly whenever two carts 15 are stored in contiguous juxtaposition, as explained hereinafter, although such a relationship is not required. It may be noted, as shown most clearly in FIG. 1, that the wheels 17 and 18 are disposed in the same direction so that the rear wheels 18 do not trail for a considerable distance behind the frame structure 16. Such an arrangement affords the shopper more toe space for convenience in propelling and manipulating the cart.

The container 19 is of generally rectangular configuration and has perimetric side and end walls respectively denoted with the numerals 28,29 and 30,31. The container 19 further includes a bottom wall 32 that is movable with respect to the perimetric side and end walls between retracted and extended positions respectively illustrated by full and broken lines in FIG. 1. The side, end, and bottom walls of the container 19 define a chamber 33 which, evidently, is expandable being increased in depth as the bottom wall 32 is displaced downwardly from the retracted toward the extended position thereof. The container 19 is open at its top to permit articles to be placed with facility into the chamber 33.

Figure 11:
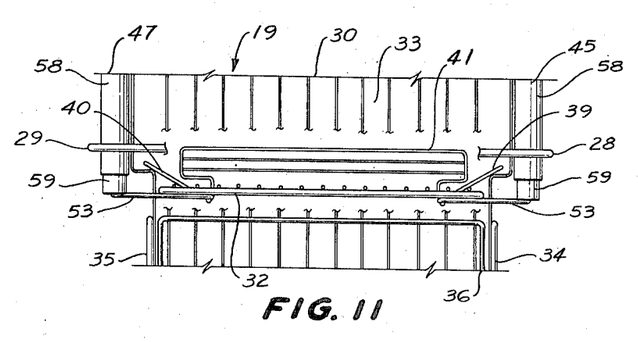
FIG. 11 is an enlarged end view in elevation, partly broken away to show interior features, of the intermediate portion of the container.

Referring to FIGS. 1 and 11 in particular, it will be noted that the container 19 decreases in size throughout the lower portion thereof, being both shorter and narrower than the upper portion of the container starting at about the center thereof in the particular embodiment of the invention being considered. For purposes of identification, the lower end portions of the side and end walls of the container 19 are respectively denoted with the numerals 34,35 and 36,37. The container 19 at its lowermost extremity is provided with a fixed lower closure wall 38 which serves as an abutment that defines the lowermost extended position of the movable bottom wall 32 in which position thereof the movable bottom wall substantially rests upon the fixed closure 38.

Evidently, then, the movable bottom wall 32 must be slightly smaller in area than the portion of the chamber 33 coextensive with and defined by the upper sections of the perimetric side and end walls 28 through 31. Accordingly, the bottom wall 32 is both shorter and narrower than the perimetric side and end walls defining the upper portion of the chamber 33 with the result that the edges of the bottom wall are spacd from the adjacent perimetric walls of the upper end portion of the container. As a consequence, small articles placed within the chamber 33 might slip past the movable bottom wall 32 in the absence of the inclusion of means to prevent such occurrence, and in the cart 15, such means includes a plurality of side and end flaps 39,40 and 41,42 (see FIG. 3 for the latter) supported adjacent the perimetric edges of the bottom wall 32 for pivotal displacements between inner and outer positions in a manner permitting relatively restricted movements of the bottom wall between the retracted and extended positions thereof. In the form shown, the flaps are pivotally supported by the bottom wall 32 and are gravity biased toward their outer position to close any space defined between the perimetric edge portions of the bottom wall 32 and bordering marginal side and end walls of the container. Further, the flaps 39 through 42 are constrained against movement into and past vertical orientations (i.e., an over-center constraint) so that the flaps are always gravity biased toward their outer positions.

In this respect, it may be observed first that the entire container 19 is constructed in the usual manner of a shopping cart and comprises a plurality of stiff wires arranged in intersecting groups each comprising a plurality of parallel wires disposed in spaced apart relation. Accordingly, the container constitutes a type of open-mesh construction in which the various components of the container are both relatively stiff or rigid and also lightweight. The intersecting wires are normally welded to each other at their points of intersection, and the strength and rigidity of the container depends upon the gauge of the wires employed and on the spacing therebetween. As concerns spacing, it may be noted that the open spaces defined by the intersecting wires forming the movable bottom wall 32 (see FIG. 2 in particular) are smaller in area than the spaces defined by the intersecting wires forming the fixed lower closure wall 38 of the container so that any article sufficiently small to fall through the open mesh of the movable bottom wall 32 will also fall even more freely through the larger open mesh of the lower closure 38, thereby preventing interference with downward displacements of the movable bottom wall 32 into juxtaposition with the fixed closure wall 38.

Figure 2:
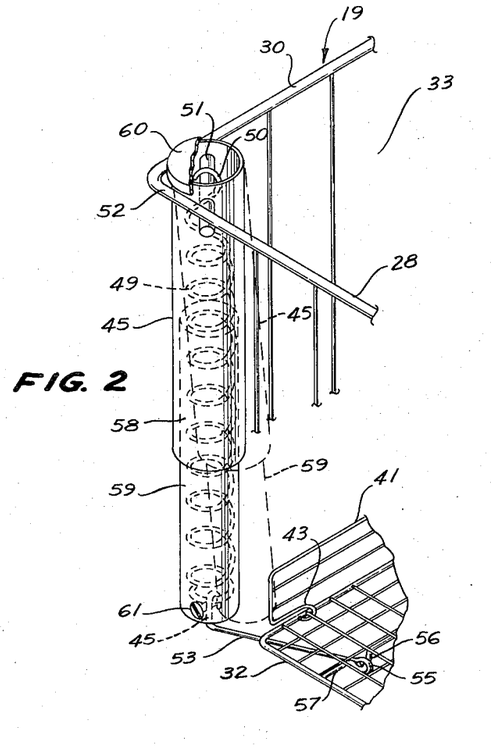
FIG. 2 is an enlarged, broken perspective view illustrating a corner portion of the container forming a part of the cart shown in FIG. 1.
Figure 3:
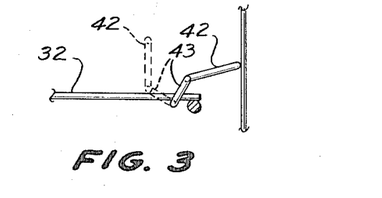
FIG. 3 is a further enlarged, broken fragmentary view illustrating a portion of the flap structure shown in FIG. 2.

Each of the flaps 39 through 42 is also constructed of intersecting wires, as shown most clearly in FIGS. 2 and 11, welded to each other to provide a rigid component. Essentially, each flap has a perimetrically extending wire which terminates adjacent each end of the flap in a hook or eye 43 that may be completely closed or open, as shown, so as to have a somewhat U-shaped configuration. In either case, the hook 43 passes one of the wires of the bottom wall 32 therethrough, and the hook is loosely related thereto so as to permit pivotal displacements of of the flap between its inner and outer positions which are respectively illustrated in FIG. 3 by broken and full lines. Although the hook 43 adjacent each end of the associated flap permits free pivotal displacements thereof, the opening through which the cooperative wire of the bottom wall 32 passes is sufficiently small that the top and bottom legs of the hook engage the cooperative wire of the bottom wall in both the inner and outer positions. As a result, such abutment of the top and bottom legs of each hook with the associated wire of the bottom wall establishes the maximum displacement of the flap into both the inner and outer positions. At the same time, however, the hook is offset somewhat from the main plane of the associated flap, as best seen in FIG. 3, so that the weight of such main flap portion always gravity biases the flap toward its outer position. Therefore, whenever the container 19 is in the horizontal position of use illustrated in FIG. 1, the flaps 39 through 42 will always tend to assume the outermost position permitted by engagement of the flaps with the respectively contiguous perimetric side and end walls of the container, as shown most clearly in FIGS. 3 and 11.

Figure 12:
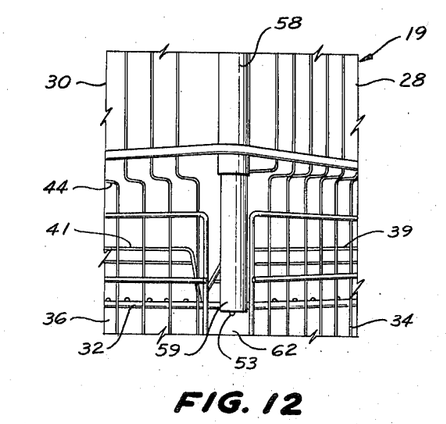
FIG. 12 is a broken corner view in elevation of the midportion of the container.

As is most evident in FIG. 12, mergence of the lower restricted side and end walls of the container 19 with the wider and longer upper portions of such perimetric walls is defined by a generally horizontal step 44 formed by an inwardly turned portion of the generally vertical or upright wires forming one of the intersecting groups thereof comprising the container 19. The side and end flaps 39 through 42 rest upon the step 44 whenever the bottom wall 32 is in or closely approximates the extreme retracted position thereof, as illustrated in FIG. 11. As the bottom wall 32 is displaced downwardly toward its extended position, as illustrated in FIG. 11, the flaps 39 through 42 slide along, and are gravity biased into engagement with, the lower restricted portions 31 through 34 of the perimetric side and end walls of the container. Since open-mesh construction of the type used for the container 19 is old and well known in the art, details concerning such construction are wholly unnecessary for a complete understanding of the invention and will not be further discussed. As in the case of the frame structure 16, the container in its entirety (or, for convenience, smaller subcomponents thereof) can be chrome plated to improve the apperaance of the entire cart, which is customary in the case of the wire used being steel.

Figure 4:
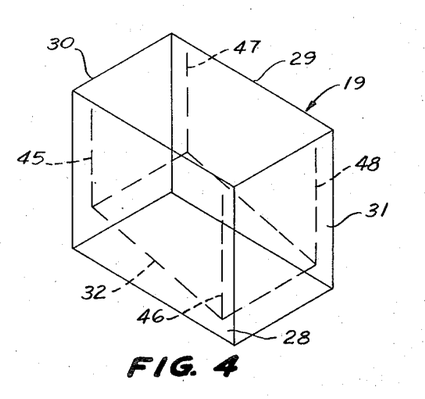
FIGS. 4, 5, and 6 are diagrammatic perspective views respectively depicting different dispositions of the bottom wall of the container under imposition of loads of various magnitudes.
Figure 5:
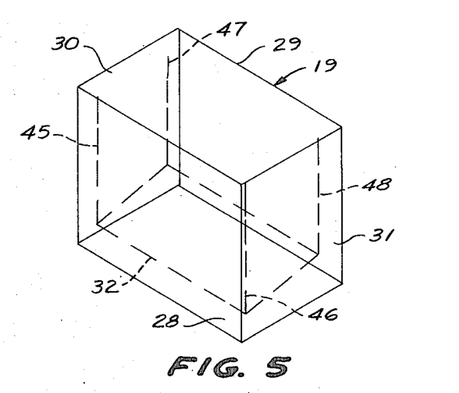

The bottom wall 32 must be supported for movement between the retracted and extended positions thereof respectively shown by full and broken lines in FIG. 1, and as will be explained in detail subsequently, the support structure used for this purpose must be of such character that it enables asymmetrical displacements of the bottom wall under the influence of nonuniformly distributed loads thereon, as indicated diagrammatically in FIGS. 4, 5 and 6. Further, the particular support structure to be considered herein is operative to urge the bottom wall 32 toward its retracted position and to permit displacements therefrom toward its extended position whenever loads of sufficient magnitude are supported thereon. In this respect, the support structure employed includes a plurality of spaced apart support components respectively disposed adjacent the corner portions of the container 19 and bottom wall 32 thereof and denoted with the numerals 45, 46, 47, and 48 (the latter of which is illustrated only diagrammatically in the drawings and can be seen in FIGS. 4 through 6). The support structures 45 through 48 are functionally independent of each other to permit the aforementioned asymmetrical displacements of the bottom wall 32. Each support component, as shown most clearly in FIG. 2, includes a tension spring 49 pivotally secured adjacent its upper end by a hook or eye 50 to a pivot pin 51 extending diagonally across a corner portion of the container 19 at the upper extremity thereof and welded to the uppermost perimetrically disposed wire 52 thereof so as to be rigidly related to the perimetric side and end walls of the container. Adjacent its lower end, the spring 49 is pivotally secured to coupling means which form a pivotal interconnection of the spring with the bottom wall 32 to permit limited translational displacements thereof relative to the perimetric end and side walls of the container, thereby preventing development of material binding constraints upon the bottom wall during any asymmetrical displacements thereof.

The coupling means in the form shown is a stiff wire or rod 53 bent upwardly and then upon itself to form an inverted, generally U-shaped hook or eye 54 that engages and connects with the spring 49 adjacent its lower end. The rodlike coupling means 53 extends inwardly beneath the corner portion of the bottom wall 32 in underlying relation therewith so as to support the same, and at its inner end it is bent to form an eye or hook 55 are pivotally engages a downwardly bowed, generally U-shaped connector 56 formed along one of the bottom wall wires which wire, for purposes of identification, is denoted with the numeral 57. The rod 53 is diagonally disposed with respect to the associated corner portion of the generally rectangular bottom wall 32, and because of the pivotal interconnection of the rod 53 at its opposite ends with the bottom wall 32 and spring 49 and further because of the pivotal connection of the spring 49 with the pivot pin 51, the bottom wall 32 is supported for generally universal articulation in the plane of the bottom wall and out of the plane thereof at least to the extent that asymmetrical displacements of the bottom wall are tolerated, as depicted in FIGS. 4 through 6.

Each support component 45 through 48 further includes a plurality of hollow telescopically related tubes circumjacent the spring 49 to enclose and protect the same. In the form illustrated, two tubes are associated with each spring 49 and they are respectively denoted with the numerals 58 and 59, the latter of which is of smaller diameter and is slidably received within the larger tube 58. The tube 58 is provided adjacent its upper end with diametrally aligned apertures through which the pivot pin 51 freely passes, thereby permitting the tube to swing or pivot in diagonal directions relative to the perimetric side and end walls of the container 19 about the axis defined by the pin 51. The tube 58 extends upwardly beyond the pin 51 and is equipped at its upper end with a closure cap 60 which may be adhesively or otherwise secured to the tube so as to prevent removal of the cap, thereby preventing access to the interior of the tube structure.

The lower tube 59 is provided at its bottom end with stop means to prevent substantial egress of the spring 49 therefrom during movements of the bottom wall 32, and such stop means may take the form of a sheet metal screw 61 extending through the wall of the tube 59 and into the interior thereof so as to form an abutment for the lower end of the spring. It should be noted that the lower wall portions 34 through 37 of the perimetric side and end walls of the container 19 must provide means at the corner portions thereof to permit the coupling rods 53 to move upwardly and downwardly with the bottom wall 32 between the retracted and extended positions thereof. Such means takes the form of corner openings 62, as shown best in FIG. 12, defined between each side wall portion 34 and 35 and the respectively adjacent portions of the end walls 36 and 37.

For purposes of facilitating unloading of the chamber 33, the side wall 29 is provided therealong with a large opening 63 disposed along the uppermost perimetric wire 52 and extending longitudinally or from front to rear for a substantial distance exceeding one half the length of the container. Ordinarily, the opening 63 is closed by a gate 64 which is selectively movable between open and closed positions. In this respect, the gate 64 is hingedly secured to a longitudinally extending length 65 of the wire defining the opening 63 by means of elongated, generally U-shaped hinge components 66 located adjacent the opposite ends of the gate. The gate 64 is formed of intersecting wires rigidly related to each other as heretofore described, and the hinge elements 66 are provided by extensions of certain of the wires located at the opposite ends of the gate.

Figure 7:
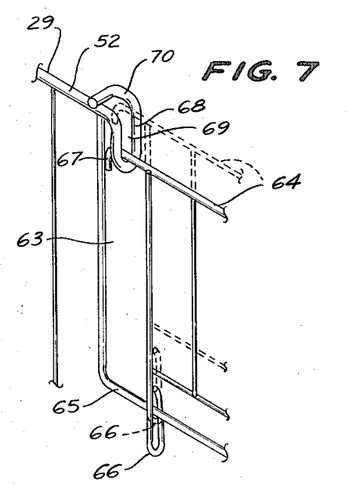
FIG. 7 is an enlarged, broken perspective view showing the movable gate which forms a part of the container of the shopping cart.

The hinge elements 66 permit swinging or angular displacements of the gate 64 relative to the associated side wall 29 of the container, and they also permit limited vertical displacements of the gate along the plane of the side wall 29 between the lower and upper positions respectively shown by full and broken lines in FIG. 7. Each of the hinge elements 66 is sufficiently long to accommodate such vertical displacements of the gate 64, and therefore defines a rather loose connection with the wire 65 passing therethrough. The gate is ordinarily constrained in the closed position thereof by stop-latch structure disposed adjacent the opposite ends of the gate and which, in each instance, includes a latch pin or finger 67 provided by the gate and a receiver 68 provided by the side wall 29.

Each receiver 68 is formed by bending an end of the perimetric wire 52 downwardly and then upwardly to form a generally U-shaped cavity 69 and then longitudinally to form a stop 70 located at a higher elevation than that of the main extent of the wire 52. The latch section is then turned inwardly and is welded to the main portion of the wire 52 so as to provide a rigid construction. Ordinarily, the gate 64 tends to be biased downwardly into the position shown by full lines in FIG. 7 by gravity so that the latch pin 67 is seated within the latch recess 69, thereby preventing angular displacements of the gate. However, the gate 64 can be elevated into the broken line position shown in FIG. 7 in which position thereof the latch pin 67 is withdrawn from the cavity 69 and is located above the main extent of the wire 52 so as to permit the gate to be angularly displaced toward the left or outwardly from the wall 29, as viewed in FIG. 7. Inward displacement of the gate 64 is prevented by abutment of the latch pins 67 with the stops or abutments 70, thereby defining the maximum inward swinging movement of the gate 64.

The described arrangement of the gate 64 is advantageous in unloading a cart because it permits a clerk at the check out counter to grasp the gate and pull the same upwardly until upward movement is prevented by engagement of the lower closed ends of the latch elements 66 with the wire section 65 whereupon the gate 64 can then be swung outwardly into the open position thereof. The upward and outward displacements of the gate 64 can be effected quickly and easily without thought or direct attention, and the large opening 63 then facilitates removal of items from the chamber 33. Following removal of all such items, the clerk simply swings the gate 64 toward the inner position while lifting the gate slightly until the latch pins 67 engage the stops or abutments 70, thereby defining the inner limit of the permissible angular displacement of the gate 64 at which time the clerk simply releases the gate to permit it to move downwardly under the influence of gravity into the closed position shown by full lines in FIG. 7. Again, the closing movements of the gate 64 can be effected in a routine manner without positive attention being given to this act.

Secured to the container 19 and extending rearwardly therefrom is a baby's or infant's seat denoted generally in FIG. 1 with the numeral 71. The seat 71 is essentially conventional, and is fabricated as an integer and then welded to the container 19 so as to be rigidly related thereto, although separate fabrication and union in this manner is not requisite. It should be observed that the seat 71 is located entirely on the exterior of the chamber 33 defined by the container 19 which is exceedingly advantageous in that it isolates bodily eliminations of an infant occupying the seat from the interior of the chamber 33 and from any products or articles then or thereafter positioned within the chamber. Further, use of the seat does not reduce the capacity of the article-receiving chamber 33, as is the case with standard shopping carts.

With the particular seat 71 shown, the seat is reinforced by angularly disposed struts 72, and it is equipped within its interior with a pivotal flap or platform 73 supported for angular displacements between the generally upright position shown and a generally horizontal position into which the platform can be displaced by angular movement in a counterclockwise direction through an arcuate distance slightly in excess of 90° from the upright position shown in FIG. 1. When the flap is in its upright position, the entire capacity of the seat 71 may be used for receiving and transporting articles therein; and when the flap is in its horizontal position, the seat is intended to be occupied by an infant who faces rearwardly with his feet and legs projecting outwardly and downwardly from the seat in underlying relation with the handle 20. Although the seat may be used for transporting articles with the platform 73 in its horizontal position, such articles must be sufficiently large to prevent loss thereof through the leg openings (not shown) at the rear of the seat 71. It should be noted that the handle 20 is located below the upper edge of the seat 71 and that the rear wall of the seat also terminates at about the elevation of the handle 20. This arrangement is beneficial in that it makes less likely the changes of an infant bumping his face or mouth against the handle 20.

Figure 8:
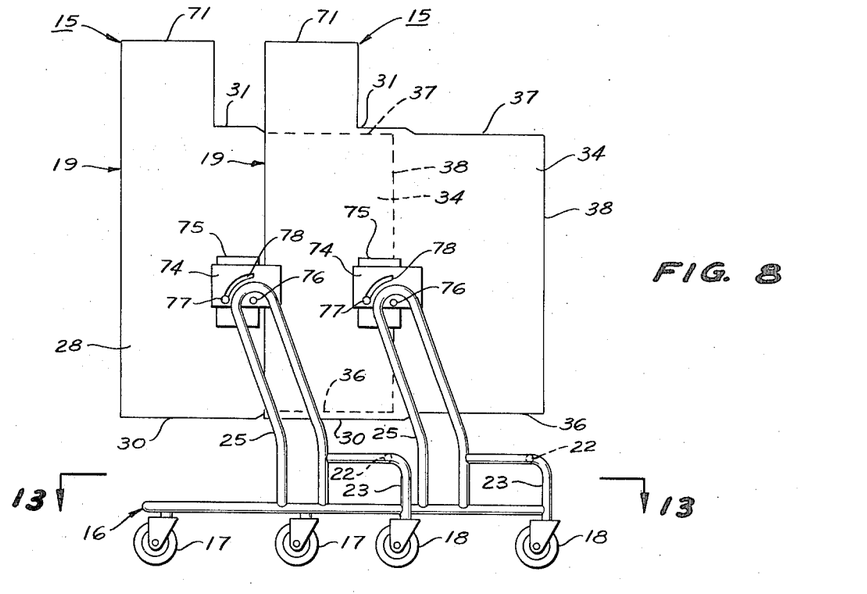
FIG. 8 is a side view in elevation, partly diagrammatic, showing a plurality of carts with the containers thereof disposed in a vertical orientation and interengaged one with another in nesting juxtaposition.
Figure 9:
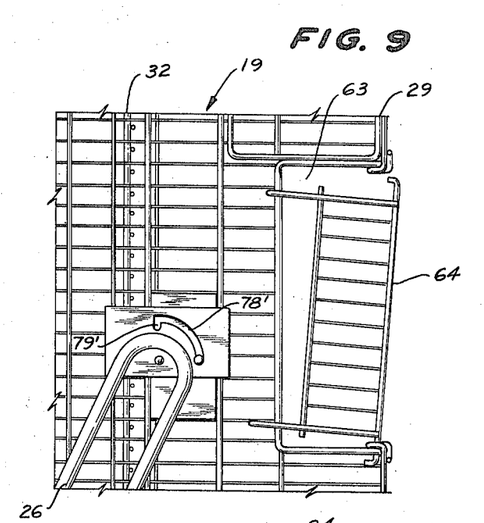
FIG. 9 is a broken side view in elevation of a portion of one of the carts illustrated in FIG. 8.
Figure 10:
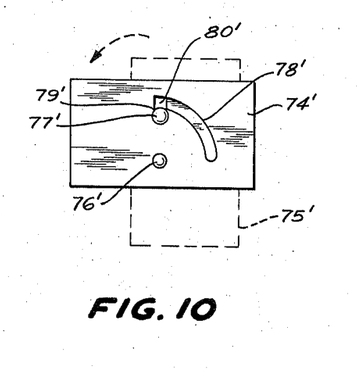
FIG. 10 is a side view in elevation of one of the mounting plate assemblies by means of which the containers are supported for pivotal displacements between the horizontal and vertical positions.

Comparison of FIG. 1 with FIGS. 8 and 9 makes it evident that the container 19 is supported for pivotal movements between generally horizontal and generally vertical positions which respectively correspond to positions of use and of storage. Permissible movement of the container 19 between such positions defines the requirement of support structure providing the same which, in the particular part 51 being considered, takes the form of mounting means pivotally securing the container 19 along the opposite perimetric side walls thereof to the upwardly extending standards forming a part of the frame structure 16. The mounting means used to effect such support of the container 19 is shown most clearly in FIGS. 1, 9, and 10, and reference will be made thereto in particular in describing the same.

The mounting means includes a pair of mounting structures which are very similar but reversely oriented because of their disposition along opposite sides of the container. Considering first the mounting structure associated with the perimetric side wall 28 and standard 25, it includes a pair of generally rectangular, essentially planar plates 74 and 75 respectively welded or otherwise secured to the standard 25 and side wall 28 so as to be rigidly related thereto. A pivot pin 76 extends through the plates 74 and 75 and interconnects the same for relative angular displacements with the facing surfaces thereof being in substantially contiguous juxtaposition. Thus, the pin 76 (and its counterpart along the opposite side of the container 19) defines the pivotal axis about which the container is selectively displaceable between the horizontal and vertical positions thereof.

The maximum permissible displacements in opposite directions of the container 19 are positively established in each instance, and in the case of the container being moved into a horizontal orientation, in part by abutment of the fixed lower closure 38 of the container with the aforementioned joist 22, as illustrated in FIG. 1, and, at the same time, in part by a stop pin 77 carried by the plate 75 for movement therewith from one end to the other of an arcuate slot 78 formed in the plate 74. Abutment of the stop pin 77 with one end of the slot occurs at about the same time the closure 38 seats upon the joist 22, as shown in FIG. 1, to establish the horizontal position of use of the container 19, and abutment with the other end of the slot occurs when the container is in its maximum upright position, as shown in FIG. 8.

As previously indicated, the mounting structure associated with the wall 29 and standard 26 is generally the same as the previously described mounting means (although it has additional features) except that there is a reversal of the orientation thereof because the two mounting structures are disposed along opposite sides of the container. For purposes of convenience, the same numerals are used where appropriate to identify the respectively corresponding components of the mounting associated with the container wall 29 and frame standard 26 except that each such numeral is primed for purposes of differentiation.

The slot 78', it should be noted, is provided with an offset recess 79 into which the pin 77' seats to constrain the container 77 against inadvertent displacement from the horizontal position shown in FIG. 1 into the generally vertical position illustrated in FIG. 8. The pin 77' is loosely supported in a channel 80 provided by the plate 75' to permit movement of the pin into and out of the recess 79 which is disposed adjacent and in substantial alignment with the pivot pin 76'. Accordingly, whenever the container 19 is swung downwardly into its horizontal position of use, the locking pin 77' is brought into alignment with the recess 79 and seats therein, thereby preventing movement of the container 19 into its upright position until the pin is displaced upwardly through the channel 80 to remove it from the recess 79.

This feature is especially advantageous in that it protects against the possibility of the container 19 swinging toward or into its upright position in the event of a heavy load being placed adjacent the forward wall 30 of the container which would tend to swing the same about the axis defined by the pins 76 and 76'. Although preventing this occurrence is beneficial at all times, it is especially desirable to prevent such tipping of the container should an infant be placed therein forwardly of the pivot axis. It will be appreciated that the stop pin 76' is also a latch pin, and it is located along the side wall 29 which is the right-hand side of the container and most proximate to the check out clerks. Thus, the latch can be released with facility thereby to permit the container 19 to be swung into its storage position after being unloaded at the check out counter. It will be understood that the latch pin can be located on either or both sides of the container 19 should this be desired.

A plurality of shopping carts 15 are adapted to nest in successive juxtaposition, as illustrated in FIG. 8, whenever the containers 19 thereof are swung into their upwardly extending, generally vertical dispositions. Nesting of the containers 19 is effected because of the arrangement of the enlarged upper end portion of each container and restricted or reduced size of the lower end portions thereof. The dimensional relationship is such that the reduced lower end portion of the container of one cart is receivable through the open top of the enlarged upper end portion of a successive container, as shown in FIG. 8. As respects such nesting of the containers of successive carts 15, it may be noted that the location of the pivotal axis defined by the pins 76 and 76' of the mounting structures is such that the lower extremity of the container 19 is located at a different position as between the horizontal and vertical orientations of the containers.

More particularly in this respect, when the container 19 is in its horizontal disposition, the bottom closure 38 is resting upon the joist 22 so as to receive support therefrom, as is most evident in FIG. 1. However, when the container 19 is displaced into its vertical orientation, the elevation of the front wall 30 therof is considerably above the elevation of the joist 22, as is evident in FIG. 8. Accordingly, whenever a container 19 is rotated or swung upwardly into its vertical position, it is also effectively elevated so that the lowermost extremity of such container is at a high elevation than is the case when the container is horizontally disposed.

It should be observed that a double or two-fold nesting action is defined whenever successive carts 15 are disposed in juxtaposed succession, as shown in FIG. 8. That is to say, not only is the restricted or reduced-dimensioned lower end portion of one container 19 inserted into the larger upper end portion of the container of the next successive cart 15, but the frame element 21 of the second or successive cart 15 is inserted into the perimetric frame member 21 of the preceding cart 15, as is clear in both FIGS. 8 and 13. Thus, a type of interlocking interconnection is established whenever successive carts are nested, with the container 19 of a preceding cart being inserted into the container 19 of the next successive cart, and with a frame portion of such successive cart being inserted into the frame of the preceding cart. Nevertheless, and contrary to the usual nesting situation, no wedging interlock is established between nesting carts because the extent to which any nesting interrelationship is established is positively defined by abutment of the upper end closures 60 of the tubes 45 through 48 with the lower end portions of the tubes 59 through 62 or, more particularly with the coupling elements 53 associated therewith. Therefore, only very minimum force is required to separate any two nesting carts 15, such force simply being that required to overcome the inertia of the cart being separated from the nested stack thereof.

It should be noted that the gate 64 does not tend to open when the container 19 is swung into the vertical disposition thereof even though spring retainers and similar devices are not employed to urge the gate toward the floating bottom wall 32 of the container. In this reference, it is seen in FIG. 9 that gravity tends to maintain the gate in its closed position because of the fastener arrangement employed to releasably secure to gate in the closed position thereof. More particularly, when the container 19 is swung upwardly, the gate 64 tends to slide downwardly which more firmly seats the lower pin 67 in the latch opening 69 even though the upper pin may be displaced outwardly from its associated opening, which does not necessarily occur. Thus, the lower latch assembly positively maintains the gate 64 in its closed position so that it does not interfere with nesting of a plurality of carts.

As previously indicated, the bottom wall 32 of the container 19 is freely displaceable between retracted and extended positions, and it is also a floating component because of the prior-described arrangement for supporting the same. As a result, the bottom wall 32 is able to accommodate with substantially no binding asymmetrical loads placed thereon, as illustrated in FIGS. 4 through 6. For example, should a heavy article be centrally disposed along either the front or back wall of the container 19, the bottom wall 32 will be displaced downwardly along such edge so that it will assume a one-directional asymmetry. This is depicted in FIG. 4 which illustrates the case of a heavy weight being placed upon the bottom wall 32 at a generally central position intermediate the supports 46 and 48. Similarly, a one-directional asymmetry of the bottom wall 32 is assumed in the case of a relatively heavy weight being placed thereon at a generally central position along one or the other of the side walls of the container 19. Such an arrangement is depicted in FIG. 5 in which a centrally oriented weight is placed on the bottom wall 32 intermediate the supports 45 and 46. Exactly the same relationship would pertain with the bottom wall 32 being displaced in an opposite direction should such weight be disposed centrally between the support 47 and 48.

Figure 6:
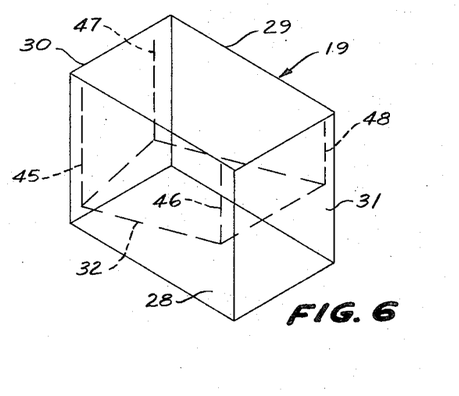

A somewhat more complex displacement of the bottom wall 32 occurs whenever a heavy weight is located in close proximity to one of the supports 45 through 48, as indicated in FIG. 6. Upon this occurrence, the bottom wall 32 assumes a two-directional asymmetry in which both longitudinal and transverse inclinations are enforced upon the bottom wall to permit it to descend along the particular support having the weight proximate thereto. Accordingly, in FIG. 6 such a weight is assumed to be located adjacent the support 45, thereby forcing the associated corner portion of the bottom wall 32 downwardly at that point. The same conditions will pertain should such weight be located adjacent any other of the supports, with the bottom wall 32 being displaced downwardly in the vicinity of such support. It will be appreciated that the bottom wall 32 may assume any position dictated by the magnitude and distribution of the load supported thereon, and it shifts readily from one configuration to another as the magnitude of such load changes and as the distribution of the load is changed. Thus, it is not essential that articles be placed carefully and in a well-distributed manner about the bottom wall 32 as the container 19 is loaded.

As is evident from the foregoing description, the capacity of the container 19 and chamber 33 defined thereby expands or enlarges automatically in accordance with the requirement defined by the weight of articles placed therein. Conversely, the size of the chamber 33 automatically decreases as articles are removed therefrom. Therefore, it is convenient both to load and unload the container because in each instance the size or capacity thereof is related to and is essentially enforced by the contemporary size of the load at any instant. At the same time, however, the chamber 33 has a maximum capacity greatly in excess of that of the usual shopping cart so that a greater load can be carried by the cart 15, thereby obviating the necessity of a shopper pulling several carts about the aisles of a market as she shops.

The handle 20 is disposed at a convenient location easy to grip by the shopper, yet its placement protects an infant from facial impact thereagainst. The inward disposition of the wheels or casters 18 at the rear of the cart provide much more space for the feet and toes of the shopper so that she does not stumble over the rear wheels and has much more freedom for manipulation of the cart. The location of the infant's seat 71 contributes immeasurably to the sanitary condition of the cart, and the movable gate 64 permits a check out clerk to remove articles from the chamber 33 with very little lifting, thereby further contributing to the ease of unloading in conjunction with the upward movement of the bottom wall 32 as articles are removed from the chamber. Thus, at the end of a day a check out clerk may be saved the expenditure of several thousand foot pounds of energy that otherwise would be required to lift thousands of articles upwardly through a substantial distance in order to remove each article from the cart and place it upon the check out counter. At the same time, however, the gate 64 is opened and closed as a rather routine manner because of the function of the latch assemblies, as heretofore explained.

The nesting disposition of a plurality of carts 15, as shown in FIG. 8, considerably reduces the storage space otherwise required, yet the carts are readily assembled into nesting juxtaposition and are easily removed therefrom with substantially no chance of sticking. The container 19 can be swung between the horizontal and vertical positions thereof with very little effort being required, and when in the horizontal position is locked therein to prevent inadvertent tipping, as heretofore explained. Further, the flaps 39 through 42 function automatically to prevent articles from slipping past the sides of the bottom wall 32, and because of the relative sizes of the openings in the bottom wall 32 and bottom closure 38, articles that do fall through the bottom 32 will fall from the bottom closure 38.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a shopping cart or the like, a container having perimetric side and end walls defining a chamber adapted to receive objects therein, a substantially rigid bottom wall for said container movable with respect to said end and side walls between retracted and extended positions to decrease and increase the capacity of said chamber, and support structure connected with said bottom wall and supporting the same for such movement thereof, said support structure being operative to urge said bottom wall toward its retracted position and to enable the same to be displaced therefrom toward its extended position in relation to the magnitudes of the loads supported thereon; said support structure comprising a plurality of spaced apart support components substantially independent of each other structurally, coupling means connecting said support components with said bottom wall to accommodate limited displacements thereof relative to said perimetric walls in directions generally normal to the direction of the aforesaid movements thereof to prevent development of material binding constraints during any asymmetrical movements of said bottom wall, and means pivotally connecting said support components with said perimetric wall for pivotal displacements in generally diagonal directions toward the center portion of said chamber also to prevent development of material binding constraints during any asymmetrical movements of said bottom wall, whereby said bottom wall is able to move asymmetrically under imposition thereon of nonuniformly distributed loads.

2. The cart of claim 1 in which each of said support components further comprises spring means resiliently biasing said bottom wall toward the retracted position thereof.

3. The cart of claim 2 in which each of said support components still further comprises a plurality of hollow telescopically related tubes circumjacent the associated spring, one of said tubes being pivotally connected adjacent its upper end to said perimetric wall by the aforesaid means therefor and another thereof being provided at its lower end with stop means to prevent substantial egress of the associated spring therefrom during movements of said bottom wall.

4. In a shopping cart or the like, a container having perimetric side and end walls defining a chamber adapted to receive objects therein, a bottom wall for said container movable with respect to said end and side walls between retracted and extended positions to decrease and increase the capacity of said chamber, and support structure connected with said bottom wall and supporting the same for such movement thereof, said support structure being operative to urge said bottom wall toward its retracted position and to enable the same to be displaced therefrom toward its extended position in relation to the magnitudes of the loads supported thereon, said bottom wall being a substantially rigid member, said support structure comprising a plurality of spaced apart support components structurally independent of each other to enable asymmetrical movements of said bottom wall under imposition thereon of nonuniformly distributed loads, each of said support components including coupling means connecting the same with said bottom wall to permit limited displacements thereof relative to said perimetric walls in directions generally normal to the direction of the aforesaid movements thereof to prevent development of material binding constraints during any such asymmetrical movements of said bottom wall, each of said support components further including a tension spring resiliently biasing said bottom wall toward its retracted position, each of said springs being connected adjacent its upper end with said perimetric walls and adjacent its lower end with said bottom wall through the associatd coupling means, said container and bottom wall being polygonal and said support components being respectively disposed adjacent the corner portions thereof, each of said springs being pivotally connected with said perimetric wall for pivotal displacements in generally diagonal directions relative to the associated corner, each of said coupling means defining a pivotal interconnection with said bottom wall such that the aforesaid displacements thereof generally traverse any such diagonal direction, and each of said support components also including a plurality of hollow telescopically related tubes circumjacent the associated spring, one of said tubes being pivotally connected adjacent its upper end to said perimetric wall and another thereof being provided at its lower end with stop means to prevent substantial egress of the associated spring therefrom during movements of said bottom wall.

5. In a shopping cart or the like, a container having perimetric side and end walls defining a chamber adapted to receive objects therein, a bottom wall for said container movable with respect to said end and side walls between retracted and extended positions to decrease and increase the capacity of said chamber, support structure connected with said bottom wall and supporting the same for such movement thereof, said support structure being operative to urge said bottom wall toward its retracted position and to enable the same to be displaced therefrom toward its extended position in relation to the magnitudes of the loads supported thereon, said bottom wall being shorter in at least one direction than said chamber with the result that at least one edge of said bottom wall in certain positions thereof is spaced from the adjacent perimetric walls of said container, and a flap supported adjacent said one edge for pivotal displacements between inner and outer positions so as to permit relatively unrestricted movements of said bottom wall between the retracted and extended positions thereof and to close any space that might otherwise exist between said one edge of said bottom wall and adjacent perimetric walls of said container.

6. The cart of claim 5 in which said flap is pivotally mounted upon said bottom wall and is biased toward the outer space-closing position thereof.

7. The cart of claim 6 in which said chamber and bottom wall are generally rectangular and the latter thereof is equipped with a plurality of said flaps respectively disposed along the marginal edge portions thereof, and in which each of said flaps is gravity-biased toward its outer position and is positively constrained against an over-center condition when in its inner position.

8. The cart of claim 5 in which one of said perimetric walls is provided with a relatively large opening therealong to facilitate removal of objects from said chamber, and further comprising a gate supported for movement between closed and open positions to enable said opening to be closed during ordinary use of said cart and to permit said opening to be uncovered whenever the cart is unloaded.

9. The cart of claim 8 in which said one perimetric wall is a side wall, and in which said gate is pivotally supported by said one side wall for movement between the open and closed positions.

10. The cart of claim 9 and further comprising stop-latch structure having cooperative elements respectively provided by said one side wall and by said gate, said stop-latch structure being operative to restrict inward movement of said gate into the interior of said chamber and to maintain the gate in the closed position thereof against inadvertent displacements therefrom.

11. In a shopping cart or the like, a container having perimetric side and end walls defining a chamber adapted to receive objects therein, a bottom wall for said container movable with respect to said end and side walls between retracted and extended positions to decrease and increase the capacity of said chamber, support structure connected with said bottom wall and supporting the same for such movement thereof, said support structure being operative to urge said bottom wall toward its retracted position and to enable the same to be displaced therefrom toward its extended position in relation to the magnitudes of the loads supported thereon, one of said perimetric walls being provided with a relatively large opening therealong to facilitate removal of objects from said chamber, a gate supported for movement between closed and open positions to enable said opening to be closed during ordinary use of said cart and to permit said opening to be uncovered whenever the cart is unloaded, said one perimetric wall being a side wall and said gate being pivotally supported thereby for movement between the open and closed positions, and stop-latch structure having cooperative elements respectively provided by said one side wall and by said gate, said stop-latch structure being operative to restrict inward movement of said gate into the interior of said chamber and to maintain the gate in the closed position thereof against inadvertent displacements therefrom, said gate being displaceable with respect to said one side wall in directions generally parallel to the aforesaid movements of said bottom wall between the retracted and extended positions thereof, said stop-latch structure including depending posts provided by said gate and eyes provided by said one side wall, said posts being gravity-biased into said eyes whenever said gate is in the closed position thereof.

12. In a shopping cart or the like, a container having perimetric side and end walls defining a chamber adapted to receive objects therein, a bottom wall for said container movable with respect to said end and side walls between retracted and extended positions to decrease and increase the capacity of said chamber, support structure connected with said bottom wall and supporting the same for such movement thereof, said support structure being operative to urge said bottom wall toward its retracted position and to enable the same to be displaced therefrom toward its extended position in relation to the magnitudes of the loads supported thereon, a baby seat secured to said perimetric walls and extending outwardly from said container adjacent one end thereof, the baby-receiving portion of said seat being entirely on the exterior of said chamber, and a handle secured to said baby seat at the outer extremity thereof, said handle being located below the upper edge of said baby seat to minimize the occurrence of impact thereagainst by the face of an infant occupying said baby seat.

13. A shopping cart or the like, comprising wheel-equipped frame structure adapted to rollingly support said cart, said frame structure including upwardly extending transversely spaced standards, a container having perimetric side and end walls and a bottom wall defining a chamber adapted to receive objects therein, and mounting means securing said side walls to the respectively associated standards to support said container for selective angular displacements between generally horizontal and generally vertical positions the latter of which enables a plurality of said carts to be stacked in contiguous succession for storage, said mounting means including a pair of mounting structures respectively associated with said side walls and standards and defining a substantially horizontal pivot axis about which said container is angularly displacable between the aforesaid horizontal and vertical positions thereof, said pivot axis being disposed with respect to said container such that the lowermost extremity thereof is at a lower elevation more proximate said wheels when the container is in its horizontal position than when it is in the vertical position thereof to enable the container to receive supplemental underlying support from said frame structure when in such horizontal position, said bottom wall being a substantially rigid member, and said support structure comprising a plurality of spaced apart support components structurally independent of each other to enable asymmetrical movements of said bottom wall under imposition thereon of nonuniformly distributed loads, each support component including coupling means connecting the same with said bottom wall to permit limited displacements thereof relative to said perimetric walls in directions generally normal to the direction of the aforesaid movements thereof to prevent development of material binding constraints during any such asymmetrical movements of said bottom wall.

14. The cart of claim 13 in which said frame structure has a bottom frame element open along the rear end portion thereof and having a reduced width adjacent its forward end portion, whereby the bottom frame element of each cart in a stacked succession thereof is insertable into the open rear end portion of the bottom frame element of a preceding cart, said container being arranged such that a portion of the container of a cart in a stacked succession thereof is insertable into the container of the next successive cart.

15. The cart of claim 14 in which each of said containers has a stepped configuration in which the lower portion thereof is smaller than the upper portion, whereby each such lower portion nests within the larger portion of the adjacent cart whenever such carts are stacked in contiguous succession as aforesaid.

16. The cart of claim 13 in which one of said mounting structures includes releasable lock means constraining said container against angular displacement into the vertical position thereof unless positively released.

17. A shopping cart or the like, comprising wheel-equipped frame structure adapted to rollingly support said cart, said frame structure including upwardly extending transversely spaced standards, a container having perimetric side and end walls and a bottom wall defining a chamber adapted to receive objects therein, mounting means securing said side walls to the respectively associated standards to support said container for selective angular displacements between generally horizontal and generally vertical positions the latter of which enables a plurality of said carts to be stacked in contiguous succession for storage, said frame structure having a bottom frame element open along the rear end portion thereof and having a reduced width adjacent its forward end portion, whereby the bottom frame element of each cart in a stacked succession thereof is insertable into the open rear end portion of the bottom frame element of a preceding cart, said container being arranged such that a portion of the container of a cart in a stacked succession thereof is insertable into the container of the next successive cart, each of said containers having a stepped configuration in which the lower portion thereof is smaller than the upper portion, whereby each such lower portion nests within the larger portion of the adjacent cart whenever such carts are stacked in contiguous succession as aforesaid, said bottom wall being a substantially rigid member, said support structure comprising a plurality of spaced apart support components structurally independent of each other to enable asymmetrical movements of said bottom wall under imposition thereon of nonuniformly distributed loads, each support component including coupling means connecting the same with said bottom wall to permit limited displacements thereof relative to said perimetric walls in directions generally normal to the direction of the aforesaid movements thereof to prevent development of material binding constraints during any such asymmetrical movements of said bottom wall, said mounting means including a pair of mounting structures respectively associated with said side walls and standards and defining a pivot axis about which said container is angularly displaceable, one of said mounting structures including releasable lock means constraining said container against angular displacement into the vertical position thereof unless positively released, said bottom wall being shorter and narrower than the chamber defined by the upper portions of said perimetric walls with the result that at least certain of the edges of said bottom wall in certain positions thereof are spaced from the adjacent perimetric walls of said container, a plurality of flaps respectively supported adjacent said certain edges for pivotal displacements between inner and outer positions so as to permit relatively unrestricted movements of said bottom wall between the retracted and extended positions thereof and to close any spaces that might otherwise exist between said certain edges of said bottom wall and adjacent perimetric edges of said container, one of said perimetric walls being provided with a relatively large opening therealong to facilitate removal of articles from said chamber, and a gate supported for movement between closed and open positions to enable said opening to be closed during ordinary use of said cart and to permit said opening to be uncovered whenever the cart is unloaded.

* * * * *